J. BAILIE.
Car-Axles and Bearings.

No. 155,216. Patented Sept. 22, 1874.

WITNESSES:
A. Bennemendorf.
A. F. Terry

INVENTOR:
John Bailie
BY Munn & Co.
ATTORNEYS.

UNITED STATES PATENT OFFICE.

JOHN BAILIE, OF MILWAUKEE, WISCONSIN.

IMPROVEMENT IN CAR-AXLES AND BEARINGS.

Specification forming part of Letters Patent No. 155,216, dated September 22, 1874; application filed August 22, 1874.

*To all whom it may concern:*

Figure 1:
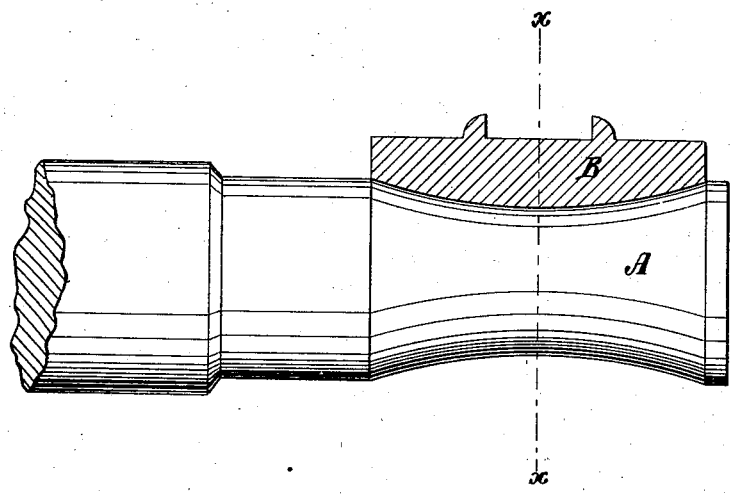
Figure 2:
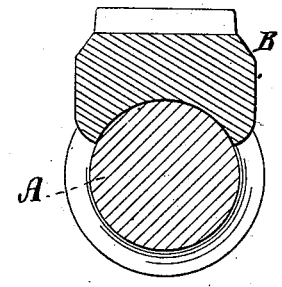

Be it known that I, JOHN BAILIE, of Milwaukee, in the county of Milwaukee and State of Wisconsin, have invented a new and useful Improvement in Axle and Bearing, of which the following is a specification:

Figure 1 is a side view of a portion of a car-axle to which my improvement has been applied, the bearing being shown in section. Fig. 2 is a cross-section of the same, taken through the line $x$ $x$, Fig. 1.

Similar letters of reference indicate corresponding parts.

My invention has for its object to improve the construction of the axles and bearings of cars, locomotives, and other vehicles in such a way as to prevent lateral motion in said vehicles, and the consequent end friction and wear of said axles and bearings.

The invention consists in the combination of two parts, one an axle-arm having a peripheral concavity formed longitudinally upon the arc of a circle, and the other a bearing-block, whose under side or wearing-surface is longitudinally convex correspondingly, as hereinafter described.

A represents a car-axle, the journal of which is made without collars, and is concaved in the arc of a circle, which concavity is generated by the revolution of the arc of a circle about the said journal, the chord of said arc being always parallel with, and at the same distance from, the axis of the axle A. B is the bearing, the friction-surface of which is convexed upon the arc of the same circle as the concavity of the axle A, as shown in Fig. 1, and at the same time is concaved laterally to fit upon the said journal, as shown in Fig. 2. With this construction, when there is any tendency of the vehicle to lateral motion, before said lateral motion can take place the whole weight of the vehicle must be overcome and said vehicle raised vertically by the bearings B moving up the curved surface of the journals of the axle, the whole weight of the vehicle being thus brought into play to resist its own tendency to slide sidewise upon the axle A, so that all end friction and all trouble from the end wear of journals and brasses are avoided, there being no lateral movement except when the car or other vehicle and its axles and trucks and their appurtenances all move together.

Having thus described my invention, I claim as new and desire to secure by Letters Patent—

The combination, with the revolving axle-journal A, having a symmetrical concavity around its entire periphery, of the bearing or block B, having a wearing-surface convex longitudinally and concave in cross-section, as shown and described.

JOHN BAILIE.

Witnesses:
 CONRAD NIEDERMAN,
 C. W. MILBRATH.